United States Patent [19]

Jaw-Shiunn

[11] Patent Number: 5,022,435
[45] Date of Patent: Jun. 11, 1991

[54] GAS REGULATOR WITH SAFETY DEVICE

[76] Inventor: Tsay Jaw-Shiunn, No. 40, Niu-Chou Tzu, Ling-Nan Village, Dung-Shan Hsiang, Tainan Hsien, Taiwan

[21] Appl. No.: 571,986

[22] Filed: Aug. 24, 1990

[51] Int. Cl.⁵ ............................................. F16K 17/20
[52] U.S. Cl. ............................. 137/613; 137/505.42; 137/519.5
[58] Field of Search ................. 137/498, 505.42, 519.5, 137/613, 614.2

[56] References Cited

U.S. PATENT DOCUMENTS

| | | |
|---|---|---|
| 3,885,589 | 5/1975 | Sung ................................. 137/613 |
| 4,373,548 | 2/1983 | Chan ............................... 137/498 X |
| 4,836,247 | 6/1989 | Chuang ..................... 137/505.47 X |

Primary Examiner—John C. Fox
Attorney, Agent, or Firm—Bacon & Thomas

[57] ABSTRACT

A gas regulator has a safety device provided in the inlet portion of a main body for automatically shutting off any excessive gas flow, a pressure gauge attached to the main body for indicating gas pressure at the inlet portion and a gas flow rate gauge also attached to the main body for indicating flow rate of the gas passing therethrough.

1 Claim, 7 Drawing Sheets

GAS REGULATOR WITH SAFETY DEVICE

BACKGROUND OF THE INVENTION

The present invention relates to a gas regulator having safety device for automatically shutting off excessive gas flow.

At the present time, petrol gas is one of the most popular energy sources as it is economical, convenient and clean in use. Unfortunately, a large number of disasters have occurred that are mainly caused by carelessness of users and the switch of the gas source is quite impossible to be shut off in time.

A gas supply system usually needs one or more regulators for a gas flow rate control under a proper gas pressure. In case that a gas regulator has been used for a long period of time, the construction of the gas regulator may be weakened due to long-term resistance of high gas pressure and oxidation to be leaky. Once the leaking petrol gas is ignited with spark or the like, an explosion or fire accident will unavoidably happen.

SUMMARY OF THE INVENTION

It is a primary object of the present invention to provide a gas regulator with a safety device for automatically shutting off any excessive gas flow.

It is another object of the present invention to provide a gas regulator having gauges for indicating gas pressure and flow rate of inlet end of the regulator.

It is yet another object of the present invention to provide a gas regulator having a valve for shutting off or regulating flow rate of the gas flow.

With the above objectives in view, a regulator according to the present invention which includes a main body defining an inlet chamber and an outlet chamber, an inlet pipe defining an inlet passage communicating the inlet chamber, an outlet pipe defining an outlet passage communicating the outlet chamber, an intermediate passage extending vertically to intercommunicate the inlet and outlet chambers, a packing ring attached to entrance of the intermediate passage and a small steel ball positioned under the packing ring in the inlet chamber and means pressed to extend through the packing ring. When an excessive gas flow occurs, the small steel ball will be pushed towards the packing ring and bound thereto to shut off the gas passage. The safety device thus closed can be retracted by pressing to separate the steel ball from the packing ring.

DETAILED DESCRIPTION OF THE PREFERRED EMBODIMENT

Figure 2:
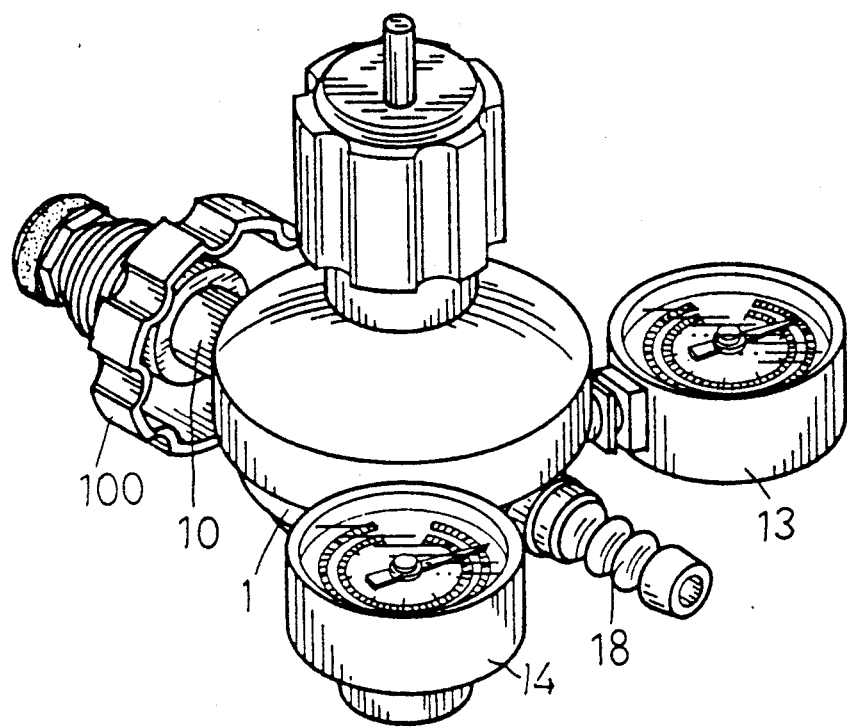
FIG. 2 is a perspective view of the preferred embodiment which is in assembled condition.

Referring now to FIG. 2, a gas regulator with a safety device and pressure and flow rate indicators according to the present invention which comprises a main body 1, an inlet tube 10 and an outlet tube 18 opposedly and integrally attached to the main body 1 and a pressure and a flow gauges 13, 14 also attached to the main body 1 for indicating gas pressure at inlet end and the gas flow rate. A joint 100 is rotatably mounted on the inlet tube 10 for securing the regulator to a spout of a gas tank (not shown) and the outlet tube 18 is formed with a corrugated surface for receiving a gas pipe (not shown) leading gas to a gas oven (not shown).

Figure 1:
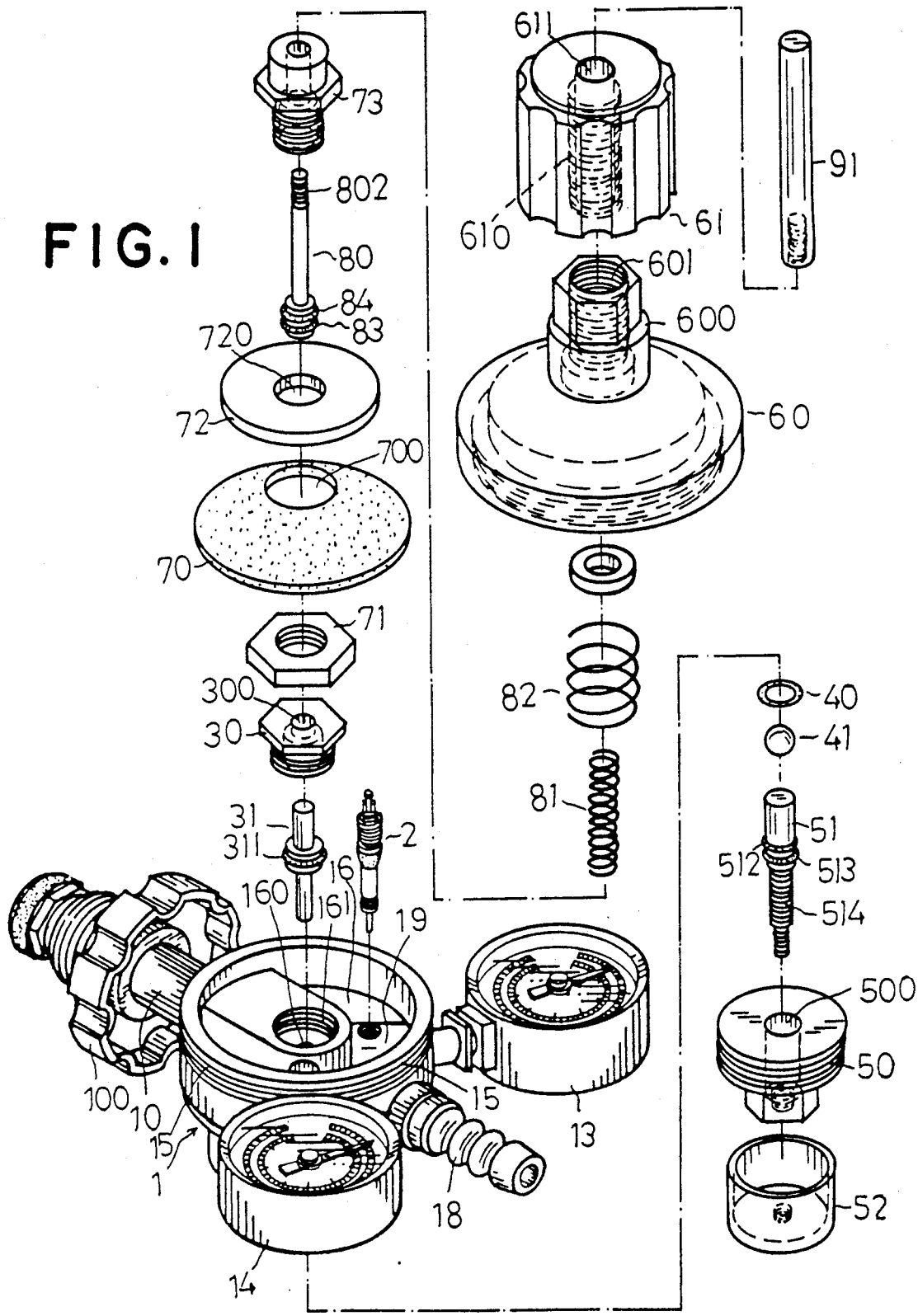
FIG. 1 is an exploded and perspective view of a preferred embodiment of the present invention.
Figure 3:
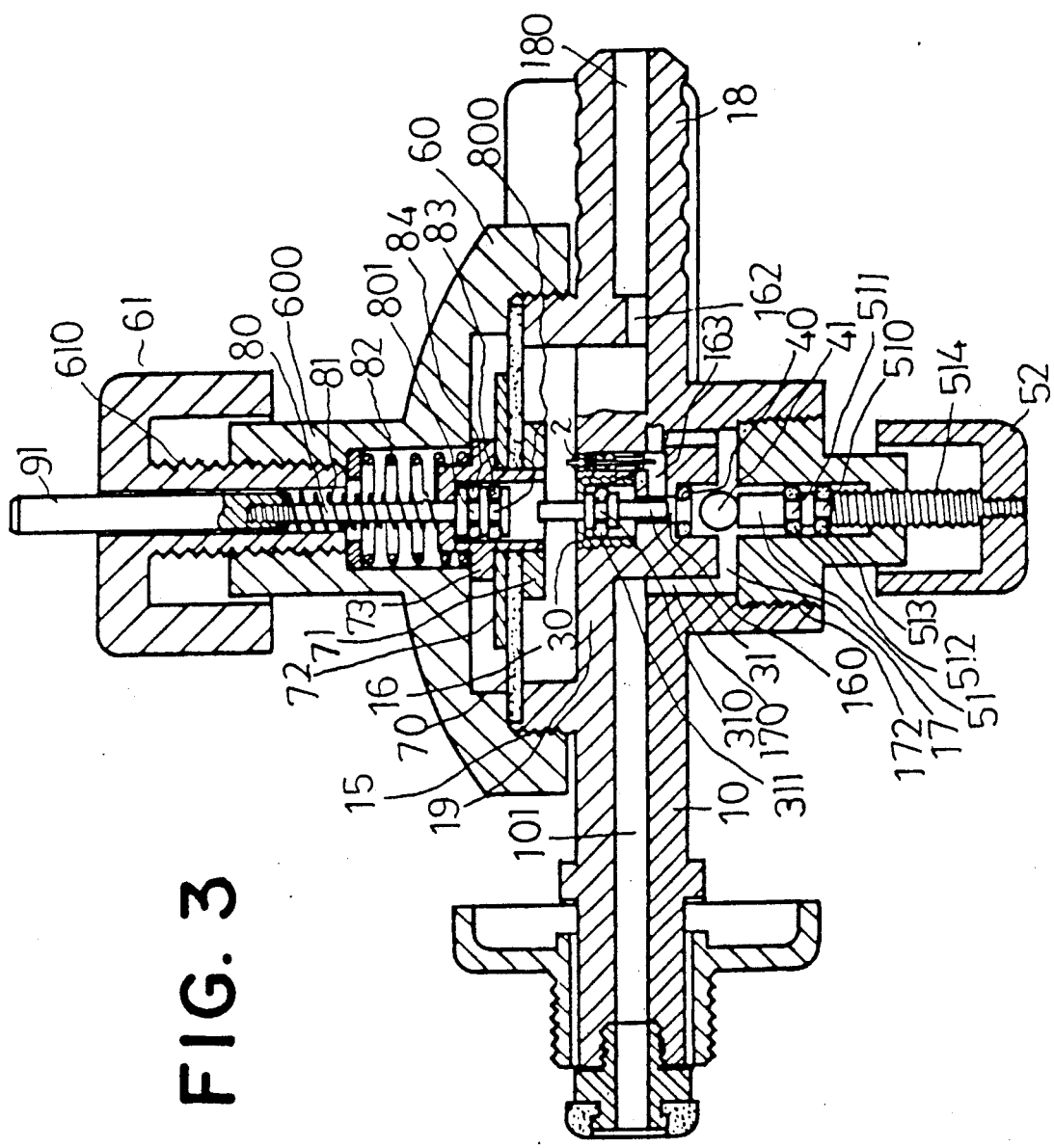
FIG. 3 is a cross-sectional view of the preferred embodiment shown in FIG. 2.

Referring to FIGS. 1 and 3, the main body 1 is formed with a top recess 16 and a bottom recess 17 at opposite sides of a partition 19, and an upper threaded portion 15. The bottom recess 17 is formed with an inner thread 172 at a lower portion for engaging a stud 50 so as to define a lower chamber 17. An intermediate passage 170 extends substantially vertically in the main body 1 for interconnecting the lower chamber 17 and an inlet passage 101 which is defined by the inlet tube 10. A central inner threaded recess 161 is formed in the partition 19 and a vertical passage 160 is coacially formed in the bottom of the recess 161 for intercommunicating the top and bottom recesses 16, 17. The lower end of the vertical passage 160 is formed with an enlarged chamber wherein a packing ring 40 is secured to the end of the vertical passage 160 and a small ball 41 is confined.

The stud 50 defines a central passage 500 and an inner threaded opening both extending vertically. A stem 51 having an outer threaded portion 514 is threaded into the central passage 500 through the inner threaded opening of the stud 50 with a top surface thereof serving as a supporting surface for resting the small ball 41 thereon. A cap-like knob 52 is secured to the lowermost end of the stem 51 for driving the stem 51 to rotate so as to slightly adjust the height of the steel ball 41 through the thread engagement between the stem 51 and the stud 50. The slight height adjustment of the steel ball 41 varies the gap between the steel ball 41 and the chamber confining the steel ball 41 that decides the flow rate of the gas passing therethrough. The stem 51 is circumferentially formed with grooves 510, 511 which respectively receive rubber rings 512, 513 for sealing the central passage 500 from gas leakage.

An intermediate passage 162 is formed in the main body 1 for intercommunicating the top recess 16 and an outlet passage 180 which is defined by the outlet tube 18.

Figure 5:
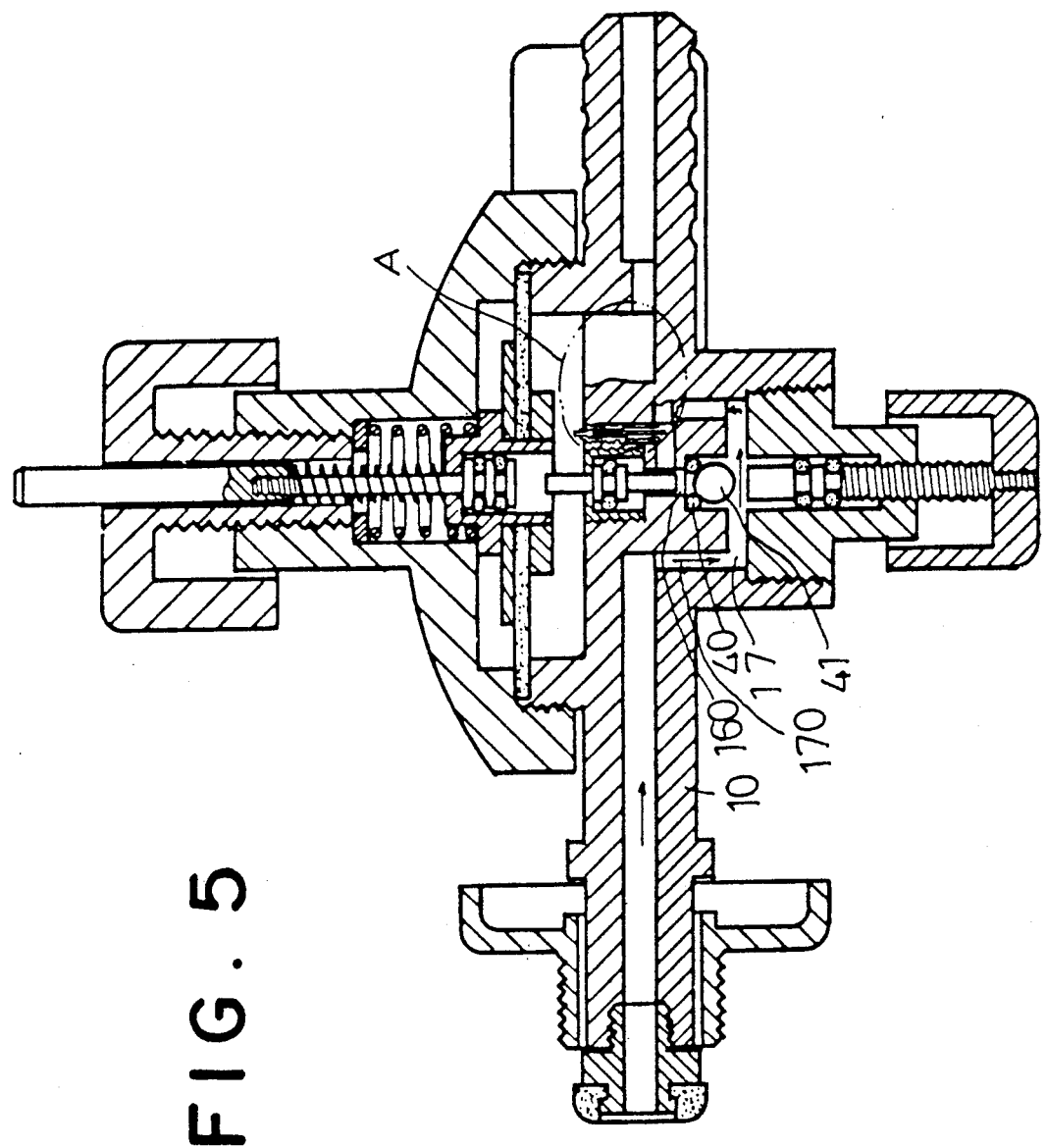
FIG. 5 is a cross-sectional view of the preferred embodiment of which a safety device is in shut-off condition.

In normal flow condition, the safety device remains open due to the fact that the small steel ball 41 is attracted by gravitational force and the steel ball 41 is kept away from the packing ring 40. In case that the regulator is out of order or the gas pipe is on fire or broken owing to accident, the gas flow rate will exceed the range of normal flow rate and will leak out. At that time, the small steel ball 41 will be pushed upward by the abrupt increase of the dynamic force of the gas flow. Furthermore, on account of the pressure difference between the upper side and the lower side of the steel ball 41, the steel ball 41 is sucked to attach on the packing ring 40 so as to close the entrance of the safety device, as best shown in FIG. 5. Since the packing ring is elastic and smooth, the steel ball 41 can be immediately bound to the packing ring 40. In consequence, the gas flow passage is exactly closed and the gas supply is thus cut off. Before the gas oven is ready for use again, it is necessary to repair the gas oven first, then the safety device is going to be retracted.

For retracting operation of the safety device, a nut 30 threaded to be engaged in the recess 161 to define a chamber, and a piston-like stem 31 with a rubber ring 311 mounted in a circumferential groove 310 at a mid portion of the stem 31 are provided. The stem 31 is slidably mounted in the chamber of the nut 30 with an upper end of the stem 31 protruding upwardly from a top opening 300 of the nut 30 and a lower end extending into the vertical passage 160.

A cap member 60 is mounted on top of the main body 1 and is secured in position by means of a thread engagement so as to retain a seal, diaphram 70 therebetween. Said seal diaphram 70 and a flange 72, both being formed with central holes 700, 720, stacking on the seal diaphram 70 are tightly sandwiched between a bolt 73 and a nut 71. The bolt 73 is formed with a recess facing downwardly and a central passage extending upwardly from the recess through the bolt 73.

A stem 80 having a threaded top end 802 and a piston-like bottom end, which is formed with spaced grooves 800, 801 for mounting rubber rings 83, 84 is received in the bolt 73 with the threaded top end 802 protruding upwardly from the bolt 73 and the piston-like bottom end slidably received in the recess of the bolt 73.

The cap member 60 has a projection 600 on top. Said projection 600 defines an inner threaded passage 601. A cap-like knob 61 is rotatably mounted on the cap member 60. Said cap-like knob 61 has a threaded shank 610 extending downwardly from a top wall thereof and a central passage 611 is defined to extend longitudinally through the shank 610 and the top wall of the knob 61. The shank 610 extends into the passage 601 and is secured thereto by means of a thread engagement.

An actuating post 91 having an inner thread cavity formed with a bottom end thereof is inserted into the central passage 611 of the knob 61 and connected to upper end 802 of the stem 80 by means of a thread engagement. A first coil spring 81 is sleeved around the stem 80 and retained between the bottom wall of the actuating post 91 and the top wall of the bolt 73 for automatically retracting the actuating post 91 and the connecting stem 80 back to a normal (unpressed) position when the actuating post is released. Said normal position maintains the bottom end of the stem 80 spaced from the top end of the stem 31. A second spring 82 is disposed between the bolt 73 and the cap member 60.

In retracting operation of the safety device, the actuating post 91 is pressed with finger to push the piston-like stem 31 to move downwardly with the stem 80. The lower end of the stem 31 extends through the central opening of the packing ring 40 and separates the steel ball 41 from the packing ring 40 so as to open the gas passage.

Figure 6:
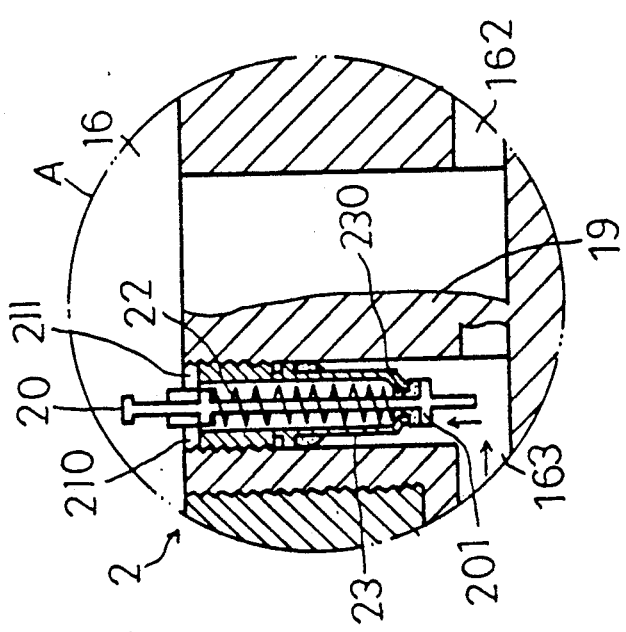
FIG. 6 is an enlarged cross-sectional view of A portion shown in FIG. 5.

A gas valve 2 is provided in the main body 1 for shutting off the gas passage or controlling flow rate of the gas flow. Said gas valve 2, as best shown in FIG. 6, includes a gas passage 163 formed in the partition 19 and laterally communicating the vertical passage 160 and bent upwardly to form a vertical gas passage parallel to the vertical passage 160 and communicating the upper recess 16, a cylindrical body 23 having an inlet opening 230 and outlet openings 210, 211 and a valve post 20 having a valve seat 201, for air-tightly closing the inlet opening 230, and a coil spring 22 disposed in the valve body 23 to maintain the valve seat 201 in a normally-closed condition.

Figure 8:
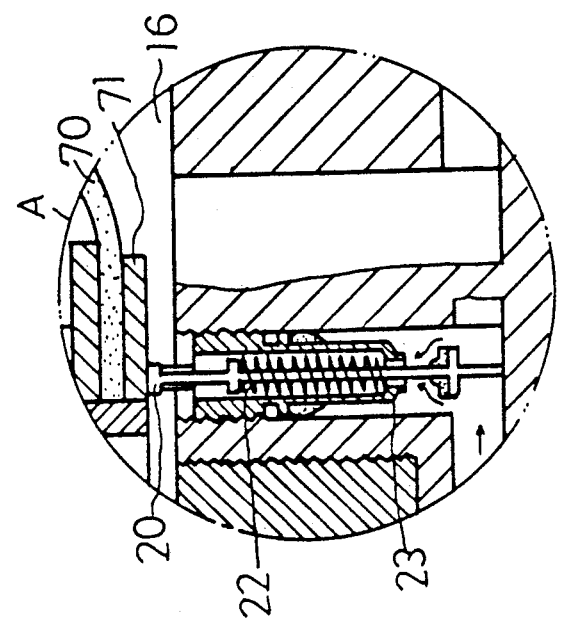
FIG. 8 is an enlarged cross-sectional view of A portion shown in FIG. 7.
Figure 7:
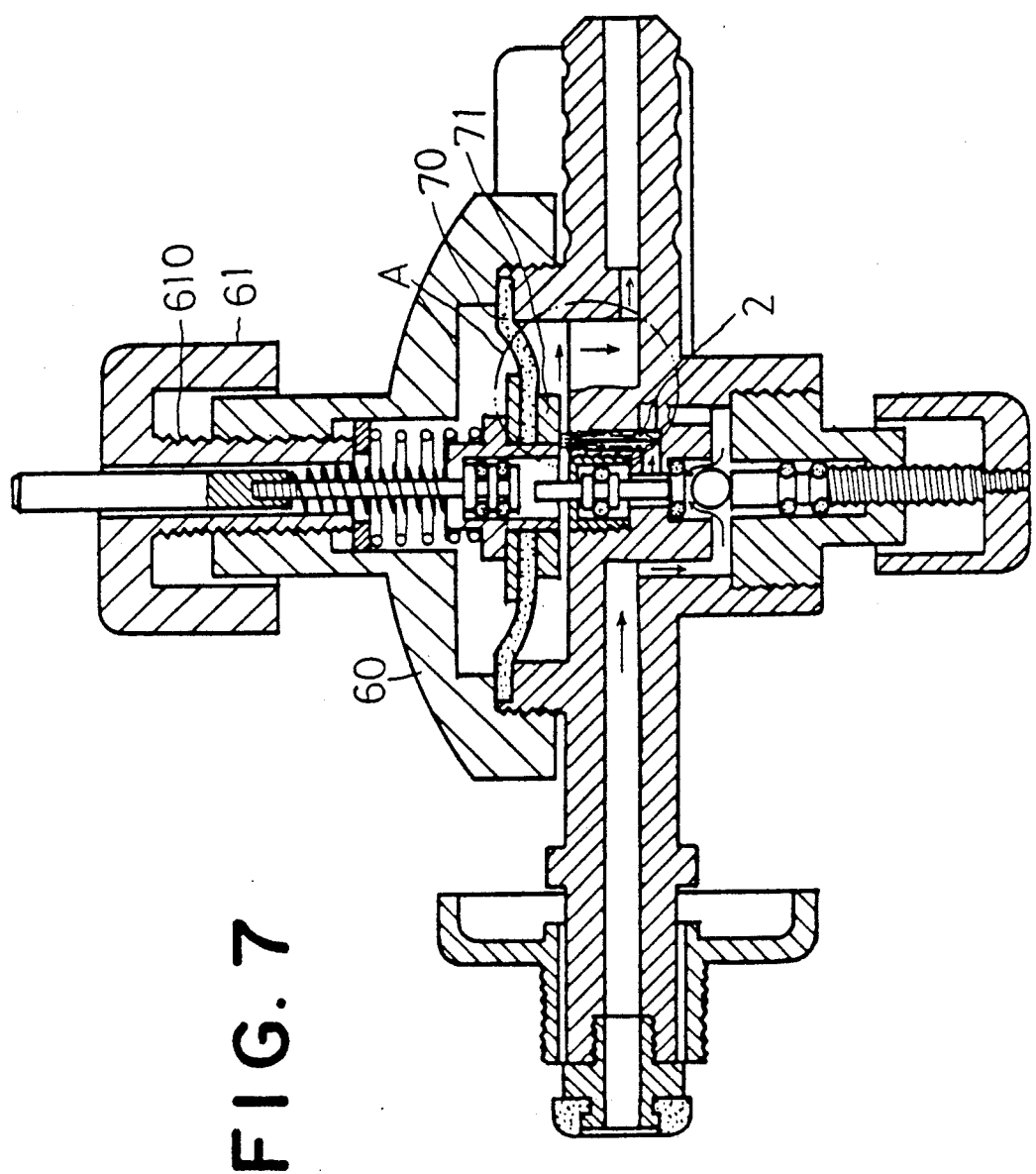
FIG. 7 is a cross-sectional view of the preferred embodiment wherein the safety device is retracted.

As shown in FIGS. 7 and 8, the shank 610 of the knob 61 can be threaded into the cap member 60 so as to push the diaphram 70 to deform and the nut 71 to move downwardly. The lowering nut 71 will press the valve post 20 to overcome the biasing force of the coil spring 22 and open the valve 2 within a range from minimum to full.

Figure 4:
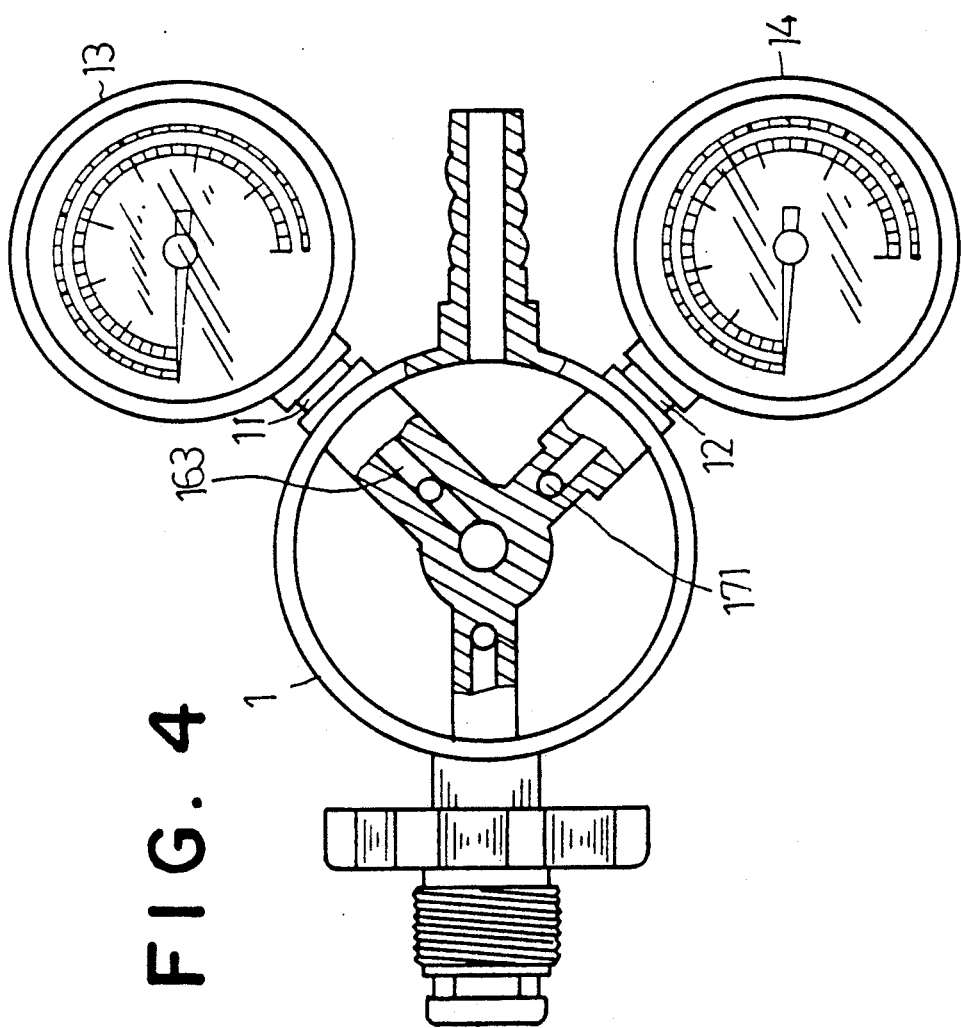
FIG. 4 is a top elevational and partially cross-sectional view of the preferred embodiment of which an upper portion is removed.

As shown in FIG. 4, the pressure indicator 14 is attached to the main body 1 through a tube 12 which defines a passage intercommunicating the intermediate passage 171 at the inlet side of this regulator and the pressure gauge 14 for indicating gas pressure in the inlet side. The flow rate indicator 13 is attached to the main body 1 through a tube 11 which defines a passage intercommunicating the passage 163 and the flow rate gauge 13.

I claim:

1. A regulator comprising:
   a main body having a circumferential side wall and a partition plate defining an upper recess and a lower recess within the main body;
   a stud member attached to lower portion of the side wall of the main body to define an inlet chamber in the lower recess;
   an inlet pipe attached to the side wall of the main body and defining an inlet passage communicating the inlet chamber;
   a diaphram made of flexible material and mounting on top of the main body to define an outlet chamber in the upper recess;
   a cap member mounting on top of the main body to secure the diaphram in position;
   an outlet pipe attached to the main body and defining an outlet passage communicating the outlet chamber;
   a first passage vertically formed in the partition plate to intercommunicate the inlet and outlet chambers and having an entrance at lower end;
   a rubber ring attached to the entrance of the first passage;
   a second passage having a vertical portion bent at a lower end to communicate the first passage and intercommunicating the inlet and outlet chambers through the entrance of the first passage;
   a third passage extending through the stud member and vertically in alignment with the first passage;
   a first knob member having a shank extending into the third passage and rotatably maintained in position by means of a thread engagement for a height adjustment relative to the rubber ring;
   a steel ball locating in the inlet chamber and resting on top of the shank of the first knob member under the rubber ring;
   a piston member slidably mounting in the first passage and adapted to be pressed to move downwardly with a lower end thereof extending through the rubber ring;
   a normally-closed valve fitting in the second passage and adapted to be pressed to open;
   a plate member attached to bottom of the diaphram;
   a second knob member having a shank extending through the cap member and rotatably maintained in position by means of a thread engagement for adjustably pressing the diaphram to deform to press the valve to open with the plate member;

a fourth passage sequentially formed in the plate member, the diaphram and the shank of the second knob member vertically in alignment with the first passage;

an actuating post fitting in the fourth passage and adapted to be pressed to push the piston member to move downwardly;

a pressure gauge having an inlet end communicating the inlet chamber of the main body; and a flow rate gauge having an inlet end communicating the second passage in the main body.

* * * * *